United States Patent

[11] 3,598,295

| [72] | Inventor | Herbert Seegers |
| | | 480 Holley Lane, Plantation, Fla. 33313 |
| [21] | Appl. No. | 874,497 |
| [22] | Filed | Nov. 6, 1969 |
| [45] | Patented | Aug. 10, 1971 |

[54] BICYCLE RADIO BRACKET
3 Claims, 3 Drawing Figs.

[52] U.S. Cl. ................................................ 224/41
[51] Int. Cl. .............................................. B62j 11/00
[50] Field of Search ........................................ 224/41, 39, 40, 42.43, 42.45

[56] References Cited
UNITED STATES PATENTS
2,391,945  1/1946  Christenson..................  224/40
2,588,671  3/1952  Tringali........................  224/41

Primary Examiner—Gerald M. Forlenza
Assistant Examiner—John Mannix
Attorney—Hill, Sherman, Meroni, Gross & Simpson ABSTRACT: An accessory bracket for bicycles which is attachable to the hub joint between the steering column and the handlebars and which includes an L-shaped bracket having one leg thereof disposed parallel with the ground and the other disposed vertically with an adjustable enclampment member operatively carried by the vertical leg. A scuff-resistant coating is placed on the top of the horizontal member and on the opposed faces of the enclampment member and the vertical leg. The enclampment member and the vertical leg are so disposed towards one another that a radio resting atop the horizontal leg can be enclamped therebetween for stability. This allows a radio to be detachably attached to the bicycle.

PATENTED AUG 10 1971

3,598,295

INVENTOR
Herbert Seegers
ATTORNEYS

BICYCLE RADIO BRACKET

BACKGROUND OF THE INVENTION

1. Field of the Invention

This invention relates to attachment means and more particularly to a bracket for attaching radios to a bicycle.

2. Prior Art

As radios have become smaller and more portable, they have found increasingly widespread use outdoors. While many radios exist small enough to be carried on the body of the listener, it is oftentimes desirable to use a radio either larger than pocket size or one in which reception is best when held away from the body. This heretofore required that listeners either carry such radios in their hands, or when riding a vehicle, attach them in some manner to the vehicle.

Such radios have recently achieved widespread use among younger people and it has become quite common for bicycle riders to take a radio with them. When riding a bicycle, for safety reasons and controllability, it is desirable that both hands remain on the handlebars. In those instances where a radio is hand carried, the rider is unable to do this. While it is common practice to have baskets for carrying things on bicycles, it is undesirable to lay a radio in such baskets where they will be free to bounce around and will become scratched or harmed.

SUMMARY OF THE INVENTION

My invention provides an inexpensive, easily attached bracket for bicycles which is specifically adapted to serve as a mounting member for a radio.

The bracket consists of an L-shaped cross section bracket member which has a mounting link pivotably attached to the bottom thereof. The mounting link is adapted to attach the bracket to the handlebar hub of a bicycle in a manner whereby the bracket is positioned in front of the handlebars with one leg thereof disposed vertically and the other disposed horizontally with the vertical leg spaced furthest from the handlebars. A clamping member consists of a longitudinal bar having two spaced-apart stems which extend through apertures in the vertical leg. The ends of the stems are threaded and carry adjustable fastening members such as nuts. In this manner, the longitudinal bar can be fixably positioned in spaced relation to the vertical leg at a position above the top of the horizontal leg. The opposed faces of the vertical leg and the bar carry a scratch-resistant coating, such as a rubber coating, as does the top of the horizontal leg. In this manner, a radio may be positioned atop the horizontal leg between the longitudinal bar and the vertical leg. The radio may then be clamped in that position by tightening the nuts.

It is therefore an object of this invention to provide a method of attaching a radio to a bicycle.

It is a further object of this invention to provide an inexpensive mounting bracket attachable to a bicycle for carrying a radio.

It is yet another and more specific object of this invention to provide a mounting bracket for attaching a radio to a bicycle wherein the bracket consists of an L-shaped cross section member and an adjustable enclamping member for enclamping the radio between one leg of the "L" and the member, the bracket being pivotably attached to the bicycle.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figures 1, 2, 3:
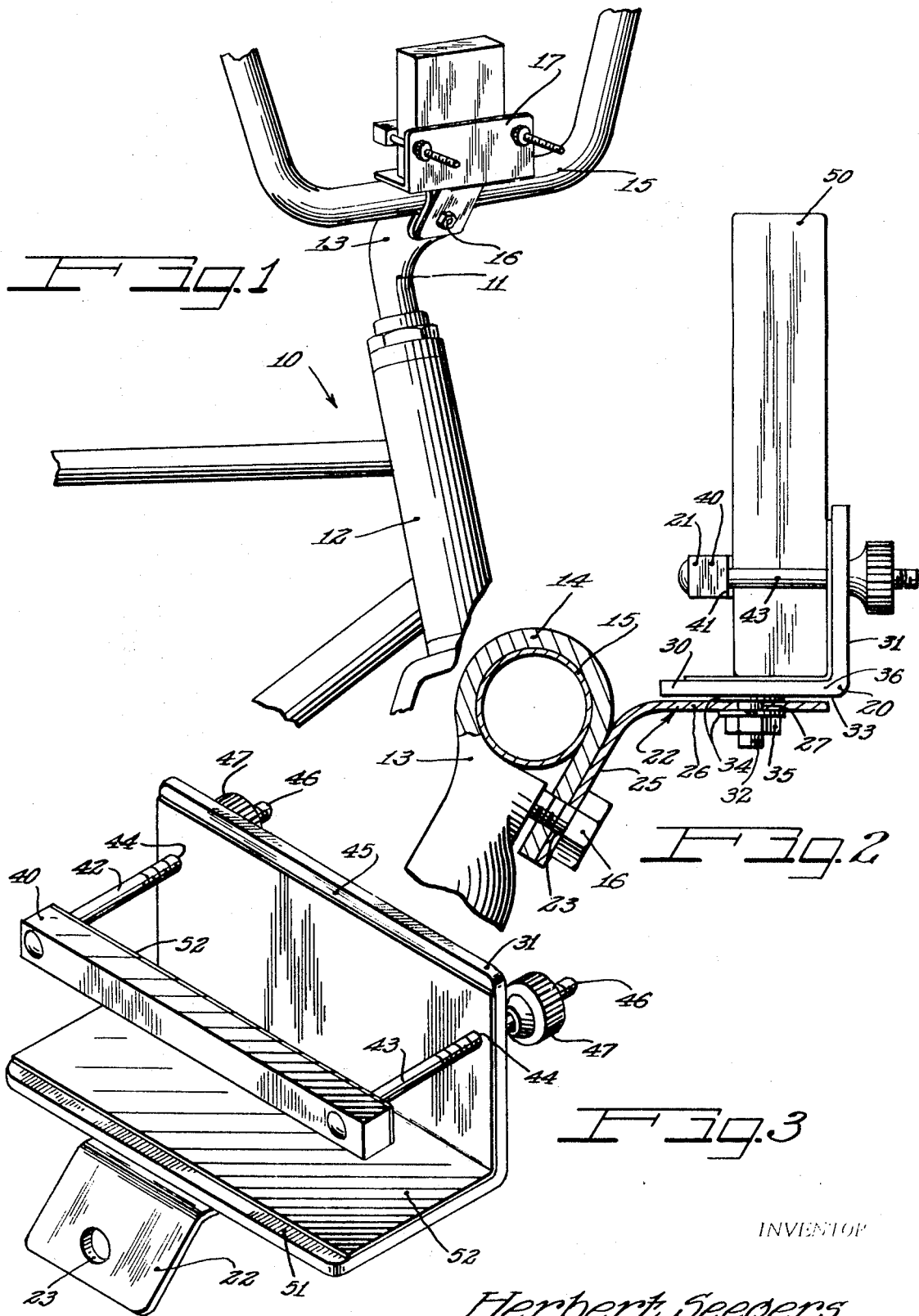
FIG. 1 is a fragmentary, perspective view of a bicycle equipped with the bracket of this invention.
FIG. 2 is a fragmentary, partially sectional side view of the bicycle and bracket of FIG. 1.
FIG. 3 is a perspective view of the bracket of this invention.

FIG. 1 fragmentarily illustrates a bicycle 10. The steering column or shaft 11 of the bicycle is journaled through the sleeve bushing 12 attached to the frame of the bicycle. The upper portion 13 of the steering column terminates in a tubular clamping member 14 which is adjustably closed around the handlebars 15 by a bolt 16. The bracket of this invention 17 is attached to the hub or adjusting clamp 14 of the bicycle 10.

The bracket, as best illustrated in FIG. 2, consists of an L-shaped cross section member 20, an enclamping member 21 and an attachment link 22.

The attachment link 22 consists of an angled piece of material such as metal or plastic having an aperture 23 in one leg thereof. The link 22 is attached to the hub 14 by passing the bolt 16 through the aperture 23 and securely tightening it.

In this manner, one of the legs 25 of the link 22 is attached to the hub in face-to-face contact therewith for stability. The other leg 26 of the angled link 22 has an aperture 27 therethrough. The link 22 is angled such that when the leg 25 is attached to the hub 14, the leg 26 is disposed horizontally.

The bracket 20 has a normally horizontal leg 30 and a normally vertical leg 31 integral therewith. The horizontal leg 30 has a bolt extension 32 depending therefrom. The bolt 32 is centrally located on the underside 33 of the leg 30. The bolt 32 is attached to the connecting link 22 through the aperture 27. Washers 34 are interposed between the leg 30 and the link 22 and between the link 22 and an enclamping nut 35 which securely attaches the bracket 20 to the connecting link 22. The presence of the washers 34 allows the bracket 20 to be pivoted on the connecting link.

The connecting link is bent away from the hub 14 whereby the leg 30 is disposed in front of the handlebars 15. The leg 31 extends upwardly from the leg 30 at the end 36 of the leg 30 remote from the handlebars 15.

The clamping member 21 consists of a longitudinal bar 40 having a flat face 41. The bar 40 is attached to the vertical leg 31 by means of two spaced-apart rods 42 and 43. The rods extend horizontally from bar 40 through apertures 44 in the vertical leg 31. The bar 40 is positioned above the horizontal leg 30 spaced from the vertical leg 31 with the flat face 41 facing a flat face 45 of the leg 31. The ends 46 of the rods 42 and 43 are threaded and receive nuts 47. By adjusting the nuts 47, the maximum distance between the face 41 and the face 45 may be set whereby an article received between the bar 40 and the vertical leg 31 may be enclamped securely therebetween. In this manner, a radio 50 placed atop the horizontal leg 30 between the bar 40 and the vertical leg 31 may be securely retained in the bracket by tightening the nuts 47 until the radio is securely enclamped.

In order to prevent scratching of the radio case and to reduce vibrations transferred from the bicycle to the radio, the face 41 of the bar as well as the face 45 of the vertical leg 31 and the top face 51 of the horizontal leg 30 are covered with a layer of cushioning material 52. The cushioning material may preferably be of a material such as rubber and preferably a soft rubber which may be bonded to the faces of the bracket and bar. The bracket and bar may be constructed of plastic or of metal, plastic being preferred to reduce radio reception interference.

It can therefore be seen that my invention provides a method of securely enclamping a radio on a bracket which is attachable to a standard bicycle without modification to the bicycle. The bracket is pivotably connected to the bicycle through a rotatable connection to a connecting link and the radio is protected against scratches and vibration.

Although the teachings of my invention have herein been discussed with reference to specific theories and embodiments, it is to be understood that these are by way of illustration only and that others may wish to utilize my invention in different designs or applications.

I claim as my invention:

1. A device for removably attaching a radio to a bicycle which comprises: an angled connecting link for attachment to the bicycle at the hub connection between the steering column and the handlebars, the angled connecting link having a horizontally disposed portion when attached to the bicycle, an L-shaped bracket member, said bracket member pivotally attached to the said connecting link and positioned above the link whereby the said bracket member has a horizontal and a vertical leg, an enclampment member, said enclampment member including a longitudinal member spaced above the horizontal leg and away from the vertical leg of the L-shaped bracket, means connecting the said longitudinal member to the said vertical leg, and said means adjustable whereby the maximum distance between the longitudinal member and the vertical leg may be adjustably set so that a radio may be enclamped therebetween.

2. The device of claim 1 wherein the upper face of the horizontal leg and the opposed faces of the vertical leg and longitudinal member are covered with a layer of rubber to prevent scratching of a radio enclamped in the device.

3. The device of claim 2 wherein the said means comprises two threaded rods with one end thereof attached to the longitudinal bar in spaced relation from one another, and the other ends project through apertures in the vertical wall and receive adjustable nuts.